3,418,329
p-AMINO-N-(3- OR 5-METHYL-2 PYRIDYL) BENZ-
AMIDE AND THE PHARMACEUTICALLY AC-
CEPTABLE ACID ADDITION SALTS THEREOF
André Robert, Kalamazoo Township, Kalamazoo County,
and Louis L. Skaletzky, Kalamazoo, Mich., assignors to
The Upjohn Company, Kalamazoo, Mich., a corporation of Delaware
No Drawing. Filed Oct. 24, 1965, Ser. No. 505,009
5 Claims. (Cl. 260—295)

ABSTRACT OF THE DISCLOSURE

The novel compounds of this invention are prepared by reacting 2 - amino - 3 - methylpyridine and 2 - amino-5-methylpyridine with a p-nitrobenzoyl halide in an inert solvent to obtain the p-nitro-N-(3 - methyl - 2 - pyridyl) benzamide and p-nitro-N-(5 - methyl - 2 - pyridyl)benzamide intermediates, respectively. These nitro compounds are subsequently reduced to obtain the desired p-amino-N-(3 - methyl - 2 - pyridyl)benzamide and p-amino-N-(5 - methyl - 2 - pyridyl)benzamide, respectively. The compounds of this invention have valuable pharmacological properties, for example, they inhibit peptic ulcers in experimental animals.

This invention relates to chemical compounds and pharmaceutical applications thereof, more particularly certain substituted p-aminobenzamides and pharmaceutical applications thereof.

According to the present invention, it has been found that a compound selected from the group consisting of p-amino-N-( 3 - methyl - 2 - pyridyl)benzamide, p-amino-N-(5-methyl-2-pyridyl)benzamide and pharmaceutically acceptable acid addition salts thereof can be advantageously employed in pharmaceutical applications, for these compounds are conveniently manufactured and lend themselves as such and with pharmaceutical carriers to beneficial pharmaceutical applications in the inhibition of peptic ulcers.

The novel compounds of the invention can be prepared by reacting 2 - amino - 3 - methylpyridine and 2-amino-5-methylpyridine with a p-nitrobenzoyl halide, preferably the chloride, to obtain p-nitro-N-( 3 - methyl- 2 - pyridyl) benzamide and p-nitro-N-(5 - methyl - 2 - pyridyl)benzamide, respectively. These nitrocompounds can then be reduced to obtain p-amino-N-(3 - methyl - 2 pyridyl) benzamide and p-amino-N-(5-methyl-2-pyridyl)benzamide, respectively.

Illustratively, 2 - amino - 3 - methylpyridine is reacted with an equimolar amount of p-nitrobenzoyl chloride in the presence of an inert solvent such as chloroform, methylene chloride, dioxane, benzene, toluene, and the like, and an acid acceptor such as pyridine, the picolines, N-methylpiperidine, triethylamine, potassium carbonate, sodium hydroxide, and the like. In some instances, e.g., when using pyridine, the acid acceptor can if desired be employed in sufficiently large amount to serve also as solvent. The p-nitro-N-(3 - methyl - 2 - pyridyl)benzamide thus prepared is then reduced to obtain p-amino-N-(3-methyl - 2 - pyridyl)benzamide, using known methods for reducing nitro compounds to amino compounds. For example, catalytic hydrogenation can be employed in the presence of a noble metal catalyst such as palladium (advantageously supported on charcoal, calcium carbonate, or other conventional supports), platinum, and the like, or a base metal catalyst such as Raney nickel, Raney cobalt, and the like, and in the presence of an inert solvent such as ethyl acetate, dimethylformamide, dioxane, methanol, ethanol, glacial or aqueous acetic acid, and the like. Alternatively, chemical reducing agents can be employed, for example, ammonium sulfide, stannous chloride and hydrochloric acid, and iron and acetic acid. In a similar manner, but starting with 2 - amino-5-methylpyridine instead of 2 - amino - 3 - methylpyridine, there is prepared p-nitro-N-(5-methyl - 2 - pyridyl)benzamide which is reduced to obtain p-amino-N-(5-methyl-2-pyridyl)benzamide.

Acid addition salts of p-amino-N-(3-methyl-2-pyridyl) benzamide and p-amino-N-(5 - methyl - 2 - pyridyl)benzamide can be prepared by reacting the free base with an appropriate amount of an inorganic or organic acid, examples of which are hydrochloric, hydrobromic, sulfuric, nitric, phosphoric, benzoic, salicylic, glycolic, succinic, tartaric, maleic, malic, pamoic, cyclohexanesulfamic, citric and methanesulfonic acids, and like pharmaceutically acceptable acids. The reaction can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances the salt precipitates from the aqueous solution, particularly when cooled, and evaporation is not necessary. If the acid is soluble in a relatively non-polar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are methanol, acetone, and ethyl acetate, respectively. Subsequent admixture of the resulting solution of acid addition salt with a solvent of relatively low polarity, for example, diethyl ether or hexane, will usually cause precipitation of the acid addition salt.

When rats are subjected to stress and exertion due to compulsory running, e.g., in a rotating cylindrical cage, gastric ulcers appear. Female rats of a body weight of 195–215 gms. were isolated individually. Water, but not food, was provided. After about 16 hours' isolation, groups of 10 were transferred to partitioned, cylindrical cages which were then rotated at a rate of 12 r.p.m. for three periods of 45 minutes, separated by two rest periods of 15 minutes. Total duration: 2 hours and 45 minutes. The rotation forces each animal to run in its partitioned area. After completing their third running cycle, the animals were killed with chloroform. Stomachs were removed and opened along the greater curvature, rinsed with lukewarm water, and examined with a 2× binocular magnifier by one unaware of the control or treated status of the various groups. Ulcerations appeared as black spots, more or less round, ranging in size from pinpoint to 3 mm. Ulceration was expressed in terms of a group "ulcer index" which is the sum of (a) incidence of animals with ulcers, divided by 10, (b) average severity of ulcers in pulses, on a scale of 0 to 3+, and (c) average number of ulcers per stomach. Maximum values for this ulcer index ranged from 19 to 23.

Materials under test for anti-ulcer activity were administered orally and subcutaneously, in a predetermined amount per kilo of body weight, just prior to placement of the animals in the cage. In assessing the effects of substances administered to the animals, differences in "ulcer index" between control and treated groups were placed in ranges 0 to −20%, −21 to −35%, −36 to −60%, −61 to −90%, and −91 to −100%. Hence, the higher the percent difference, the more beneficial is the compound administered. The compounds of the present invention also produce in animals such as mice and rats central nervous system depression, protection against convulsions due to supramaximal electroshock or thiosemicarbazide, mild diuresis, sedation, and retarded gastric emptying time.

When used in pharmaceutical applications, the particular compound can be administered as such. However, it is preferred to first mix the compound with a solid or liquid oral carrier or incorporate it into a liquid parenteral carrier. Solid oral carriers such as starch, sugar, talc and the like are useful in preparing powders for direct administration. Such powders can also be used to prepare tablets and filled gelatin capsules. Suitable additional carriers include lubricants such as magnesium stearate, binders such as gelatin, and disintegrating agents such as corn starch and methylcellulose. Liquid oral carriers include water, edible vegetable oils, glycerol, and sorbitol. Liquid parenteral carriers include water for injection, vegetable oils and N,N-dimethylacetamide.

The dosage of the compounds varies with the age, weight and condition of the animal under treatment. An oral dosage of from about 25 mg./kg. to about 75 mg./kg. is usually sufficient. Daily administration of from one to four dosages is preferred. For parenteral administration to animals such as cattle, horses, rats, pigs and dogs, the dosage is from about 25 mg. to about 150 mg./kg., one to four times per day. Unitary dosage forms for oral administration such as tablets and capsules contain from about about 250 mg. to about 10 gm. of the active compound. Liquid dosage forms for oral administration contain by weight from about 1% to about 50% and are administered in dosages of from about 1 ml. to about 1000 ml. Dosage forms for parenteral administration must be sterile as required by the art. They contain by weight from about 5% to about 50%.

Beneficial supplementary ingredients include, for example, antacids such as aluminum hydroxide, calcium carbonate and magnesium trisilicate; sedatives such as phenobarbital, butabarbital and amobarbital; and tranquilizers such as meprobamate and chlorpromazine.

For the treatment of peptic ulcer in adult humans, from about 50 mg. to about 2000 mg., preferably from about 100 mg. to about 1000 mg. is orally administered one to four times daily. A parenteral dosage of from about 25 mg. to about 150 mg./kg. is administered one to four times daily. Beneficial effects are also obtained in combatting nausea.

The following examples illustrative how to prepare the novel compounds of the present invention.

EXAMPLE 1 p-Nitro-N-(3-methyl-2-pyridyl)benzamide (A) A mixture consisting of 5.8 gm. (0.054 mole) of 2 amino-3-methylpyridine, 10.0 gm. (0.054 mole) of p-nitrobenzoyl chloride, 15 ml. of pyridine and 25 ml. of chloroform was heated on a steam bath for 1 hour, during which time the chloroform evaporated. The mixture was cooled, diluted with 100 ml. of ethanol, and allowed to stand at about 25° C. until crystallization occurred. The resulting solid was recovered by filtration, washed with water and dried. There was thus obtained 8.9 gm. (64.5% yield) of p-nitro-N-(3-methyl-2-pyridyl) benzamide; M.P. 192–195° C. An analytical sample was prepared by recrystallization from aqueous acetic acid; M.P. 196–197° C.

Analysis.—Calcd. for $C_{13}H_{11}N_3O_3$: C, 60.69; H, 4.31; N, 16.34. Found: C, 60.58; H, 4.23; N, 16.56.

(B) The same compound was prepared on a larger scale as follows.

During a one-hour period, a solution of 371 gm. (2 moles) of p-nitrobenzoyl chloride in 800 ml. of chloroform was added to a stirred solution of 216 gm. (2 moles) of 2-amino-3-methylpyridine in 800 ml. of chloroform and 600 ml. of pyridine, the reaction mixture being maintained between 10° and 15° C. by means of an ice bath. Stirring was continued for one hour, the mixture was allowed to stand at about 25° C. for 16 hours, and was then placed on a steam bath for 1.5 hours to evaporate the choloroform. The warm residue was diluted first with 1 liter of ethanol and then with 2 liters of water. The resulting suspension was cooled to about 25° C. and filtered. By washing the filter cake successively with water and ethanol, and air-drying, there was obtained 388 gm. of crude p - nitro - N-(3-methyl-2-pyridyl)benzamide. Recrystallization from 1-butanol provided 290 gm. of purified p-nitro-N-(3-methyl-2-pyridyl)benzamide.

EXAMPLE 2 p-Nitro-N-(5-methyl-2-pyridyl)benzamide

A solution of 56.0 gm. (0.3 mole) of p-nitrobenzoyl chloride in 120 ml. of chloroform was added during 5 minutes to a stirred solution of 32.4 gm. (0.3 mole) of 2-amino-5-methylpyridine in 120 ml. of chloroform and 90 ml. of pyridine, the reaction mixture being maintained between 40° and 50° C. by means of a cold-water bath. The mixture was then stirred for 15 minutes, heated on a steam bath for 1.5 hours to evaporate chloroform, and poured into ice water. The resulting solid was recovered by filtration, washed successively with water, 5% aqueous sodium carbonate solution, and water, and was then recrystallized from ethanol. There was thus obtained 61.2 gm. (79.5% yield) of p-nitro-N-(5-methyl-2-pyridyl)benzamide; M.P. 179–180° C.

Analysis.—Calcd. for $C_{13}H_{11}N_3O_3$: C, 60.69; H, 4.31; N, 16.34. Found: C, 60.89; H, 4.15; N, 16.18.

EXAMPLE 3 p-Amino-N-(3-methyl-2-pyridyl)benzamide and acid addition salts thereof (A) (free base).—A mixture of 15.4 gm. (0.06 mole) of p-nitro-N-(3-methyl-2-pyridyl)benzamide and 150 ml. of 70% aqueous acetic acid was hydrogenated in the presence of 0.6 gm. of 30% palladium-on-carbon catalyst at about 25° C. and an intial hydrogen pressure of 50 p.s.i. The theoretical amount of hydrogen was absorbed in about 1 hour, after which the mixture was filtered and the filtrate was concentrated under reduced pressure in order to remove acetic acid. The liquid residue was thoroughly mixed with chloroform and saturated aqueous sodium bicarbonate solution. The organic layer was separated, dried with anhydrous magnesium sulfate, and concentrated to dryness under reduced pressure. The resulting amorphous solid was washed with diethyl ether and recrystallized from anhydrous ethanol to obtain 7.5 gm. of p-amino-N-(3-methyl-2-pyridyl)benzamide ethanol solvate. By recrystallization from ethyl acetate, unsolvated p-amino-N-(3-methyl-2-pyridyl)benzamide was obtained; m.p. 175–176° C.

Analysis.—Calcd. for $C_{13}H_{13}N_3O$: C, 68.70; H, 5.77; N. 18.49. Found: C, 68.44; H, 5.44; N, 17.98.

The $LD_{50}$, intraperitoneally, subcutaneously and orally, in rats was 707 mg./kg. At oral dosages of 25 to 50 mg./kg. to rats, percent ulcer index differences were −24 to −94. At subcutaneous dosages of 50 to 150 mg./kg., percent differences were −28 to −94.

(B) (dihydrochloride).—A solution of 20.0 gm. (0.088 mole) of p-amino-N-(3-methyl-2-pyridyl)benzamide in 200 ml. of methanol was acidified with 20 ml. of approximately 9 N methanolic hydrogen chloride. The mixture was cooled and filtered to collect the crystalline material which had separated. This material was washed with 2-propanol and dried. There was thus obtained 18.8 gm. of p-amino-N-(3-methyl-2-pyridyl)benzamide dihydrochloride, and an additional 6.0 gm. (total yield 94%) was obtained by concentrating the filtrate. This compound, when heated in a capillary tube, bubbled at 240–250° C. but did not melt up to 340° C.

*Analysis.*—Calcd. for $C_{13}H_{13}N_3O \cdot 2HCL$: C, 52.01; H, 5.04; Cl, 23.62; N, 14.00. Found: C, 52.05; H, 5.06; Cl, 23.60; N, 14.17.

At oral dosages of 40 to 75 mg./kg. to rats, percent ulcer index differences were −35 to −90. At a subcutaneous dosage of 75 mg./kg., percent difference was −71.

(C) (maleate).—A solution of 11.6 gm. (0.1 mole) of maleic acid in 50 ml. of methanol was added to a solution of 20.0 gm. (0.088 mole) of p-amino-N-3-methyl-2-pyridyl)benzamide in 200 ml. of methanol. The mixture was diluted with 100 ml. of 2-propanol, cooled, and filtered. There was thus obtained 22.6 gm. of p-amino-N-(3-methyl-2-pyridyl)benzamide maleate; M.P. 132–134° C. After recrystallization from 125 ml. of ethanol there was obtained 17.0 gm. of this compound; M.P. 134–135.5° C.

*Analysis.*—Calcd. for $C_{13}H_{13}N_3O \cdot C_4H_4O_4$: C, 59.47; H, 4.99; N, 12.24. Found: C, 59.60; H, 4.93; N, 12.17.

At oral dosages of 50 to 75 mg./kg., percent ulcer index differences were −21 to −90. At a subcutaneous dosage of 75 mg./kg., percent difference was −66.

p-Amino-N-(3-methyl-2-pyridyl)benzamide can be converted to other acid addition salts, e.g., hydrobromide, sulfate, nitrate, phosphate, benzoate, salicylate, glycolate, succinate, tartrate, malate, pamoate, cyclohexanesulfamate, citrate and methanesulfonate, by reacting the free base with the appropriate acid as described above.

EXAMPLE 4 p-Amino-N-(5-methyl-2-pyridyl)benzamide

A suspension of 25.7 gm. (0.1 mole) of p-nitro-N-(5-methyl-2-pyridyl)benzamide in 250 ml. of glacial acetic acid was hydrogenated in the presence of 1.0 gm. of 10% palladium-on-charcoal catalyst at about 25° C. and an initial hydrogen pressure of 50 p.s.i. The theoretical amount of hydrogen was absorbed in 1.25 hours, after which the mixture was filtered and the filtrate was concentrated under reduced pressure. The residue was basified with 10% aqueous sodium carbonate solution. The solid which separated was collected by filtration, washed with water, and extracted into methylene chloride. The methylene chloride solution was washed with water, dried with anhydrous magnesium sulfate, and concentrated to dryness. The resulting solid was recrystallized from a mixture of chloroform and Skellysolve B (mixed hexanes). The p-amino-N-(5-methyl-2-pyridyl)benzamide thus obtained weighed 18.0 gm. (79% yield); M.P. 167–168° C.

*Analysis.*—Calcd. for $C_{13}H_{13}N_3O$: C, 68.70; H, 5.77; N, 18.49. Found: C, 68.30; H, 5.23; N, 18.32.

What is claimed is:

1. A compound selected from the group consisting of p-amino-N-(3-methyl-2-pyridyl)benzamide, p-amino-N-(5-methyl-2-pyridyl)benzamide, and pharmaceutically acceptable acid addition salts thereof.
2. p-Amino-N-(3-methyl-2-pyridyl)benzamide.
3. p-Amino-N-(3-methyl-2-pyridyl)benzamide dihydrochloride.
4. p-Amino-N-(3-methyl-2-pyridyl)benzamide maleate.
5. p-Amino-N-(5-methyl-2-pyridyl)benzamide.

References Cited

FOREIGN PATENTS 519,555  12/1955  Canada.

JOHN D. RANDOLPH, *Primary Examiner.*

A. L. ROTMAN, *Assistant Examiner.*

U.S. Cl. X.R.

260—296; 167—55, 65